United States Patent [19]

Scheldorf et al.

[11] 4,396,848
[45] Aug. 2, 1983

[54] APPARATUS AND METHODS FOR CONTROLLING OIL FLOW IN ELECTRIC MOTOR AIR GAP, ROTORS FOR SUCH MOTORS, AND METHODS OF MAKING THE SAME

[75] Inventors: Owen H. Scheldorf, Louisville, Ky.; Robert J. Alvarez, Tyler, Tex.

[73] Assignee: General Electric Company, Fort Wayne, Ind.

[21] Appl. No.: 190,192

[22] Filed: Sep. 24, 1980

[51] Int. Cl.³ .............................................. H02K 9/00
[52] U.S. Cl. ........................................ 310/54; 310/61; 310/598; 310/372
[58] Field of Search ...................... 310/52, 53, 54, 55, 310/57, 58; 60 R, 60 A, 61, 64, 65, 42, 216, 261, 264, 265, 262, 90, 211, 267; 29/598; 417/312, 415, 372

[56] References Cited

U.S. PATENT DOCUMENTS

| | | | |
|---|---|---|---|
| 2,428,634 | 10/1947 | Nordstrum | 310/54 |
| 2,605,876 | 8/1952 | Becker | 192/21.5 |
| 3,075,106 | 1/1963 | Chi | 310/60 |
| 3,263,106 | 7/1966 | Divers | 310/54 |
| 3,330,031 | 7/1967 | Rediger et al. | 29/598 |
| 3,373,690 | 3/1968 | Unger | 310/61 |
| 3,577,024 | 5/1971 | Inagaki et al. | 310/61 |
| 3,586,456 | 6/1971 | Giacosa | 417/312 |
| 3,600,111 | 8/1971 | Rogers | 417/312 |
| 3,618,337 | 11/1971 | Mount | 62/505 |
| 3,645,112 | 2/1972 | Mount et al. | 62/505 |

FOREIGN PATENT DOCUMENTS

| | | | |
|---|---|---|---|
| 379065 | 8/1932 | United Kingdom | 310/162 |
| 674683 | 6/1952 | United Kingdom | 310/61 |
| 863964 | 3/1961 | United Kingdom | 310/58 |
| 1275156 | 5/1972 | United Kingdom | 310/54 |

*Primary Examiner*—R. Skudy
*Attorney, Agent, or Firm*—Ralph E. Krisher, Jr.

[57] ABSTRACT

A method is disclosed of counteracting the tendency for oil to enter a compressor motor air gap. The method includes the provision of means that interrupt the normally smooth surface of a rotor to which oil would otherwise adhere. Either alternatively or additionally, a sweeping action is carried out for moving oil to stator slots adjacent to the motor air gap and thus out of the air gap. Departure from conventional rotor construction includes providing one or more grooves along the surface of the rotor. Grooves may be cut into rotor surfaces by a file or ball end mill. In other forms, grooves or dents may be coined or otherwise pressed into the rotor; or such grooves may be provided as a result of the configuration of the individual rotor laminations. The grooves may be disposed parallel to the rotor axis or disposed spiralled (clockwise and counterclockwise); and either one or a plurality of grooves may be provided.

19 Claims, 12 Drawing Figures

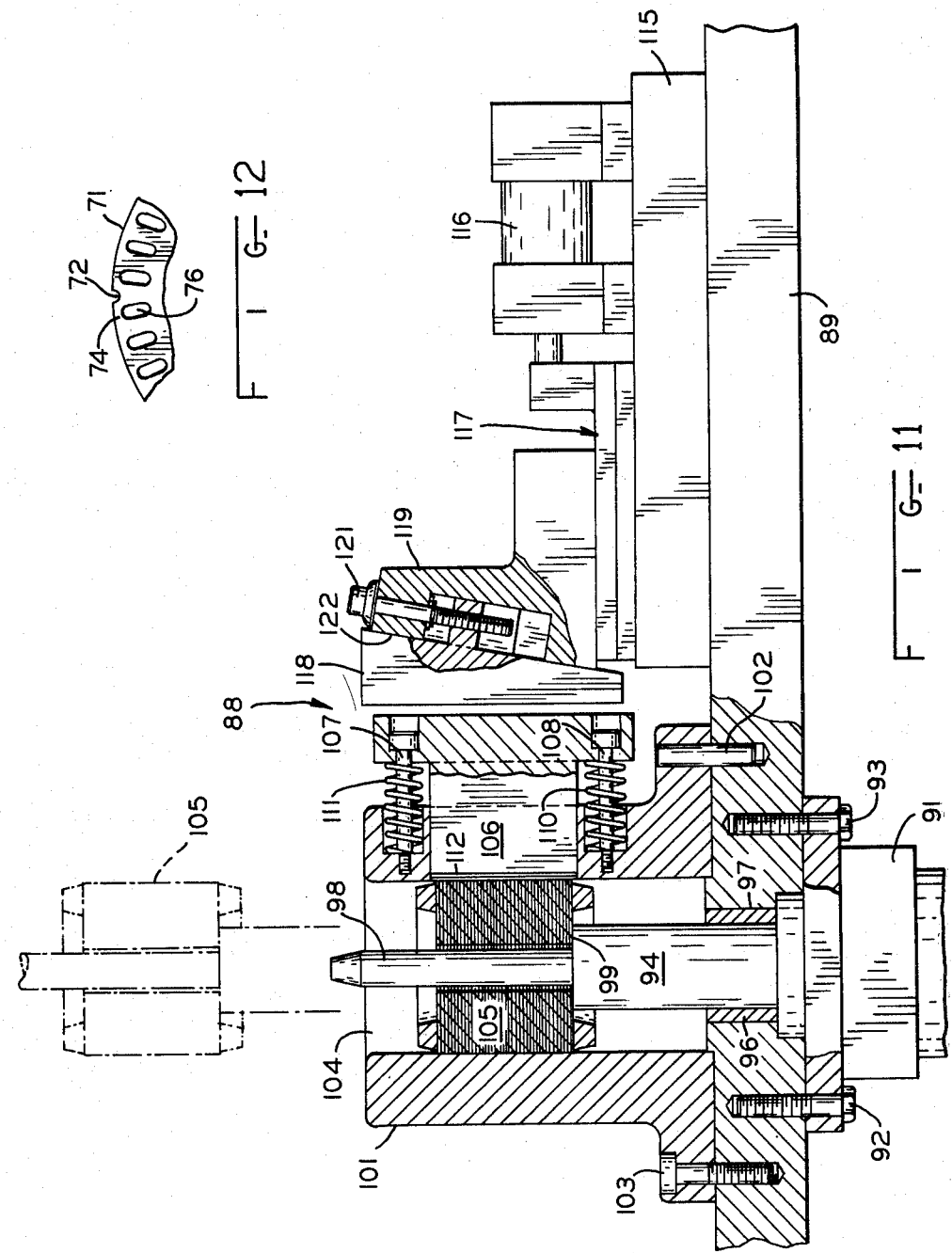

APPARATUS AND METHODS FOR CONTROLLING OIL FLOW IN ELECTRIC MOTOR AIR GAP, ROTORS FOR SUCH MOTORS, AND METHODS OF MAKING THE SAME

BACKGROUND OF THE INVENTION

The present invention relates generally to methods and means for checking or controlling the presence of oil in the air gap of electric motors and, more particularly, to improved rotors for such motors and methods of making the same.

The present invention is of particular utility in the context of hermetic compressors utilized for refrigeration purposes; and is exemplified herein in the context of a compressor wherein the motor shaft axis is horizontally disposed. It should be noted however that the benefits of the present invention may be enjoyed in other applications, including vertical motor shaft applications. It thus should be understood, as the following description proceeds, that the disclosure herein is by way of illustration and exemplification rather than for purposes of limitation.

One of the long-standing problems in the hermetically sealed refrigeration compressor art has to do with controlling the temperature of the electric motor utilized for driving the compressor. It has long been recognized that it is desirable to pump lubricating oil onto the motor for cooling purposes. For example, Mount U.S. Pat. No. 3,618,337 (which issued Nov. 9, 1971) illustrates, in a vertical motor compressor application, the concept of pumping oil from a sump to the motor winding end turns. This patent also illustrates the procedure of deliberately dispersing oil and refrigerant into the air gap between the rotor and stator of the motor. U.S. Pat. No. 3,645,112 of Mount et al (issued Feb. 29, 1972) illustrates a horizontally disposed compressor motor and, again, discloses means for deliberately dispersing refrigerant on a motor for cooling purposes. This patent also clearly shows an arrangement for deliberately moving the cooling medium (which presumably includes lubricating oil) along the air gap of the stator and rotor in the compressor.

U.S. Pat. No. 3,586,456 to Giacosa (of June 22, 1971) shows another horizontally disposed motor having a specific means for lubricating the motor bearings in a refrigerant compressor; while U.S. Pat. No. 3,600,111 to Rogers which issued Aug. 17, 1971 (and which is assigned to the same assignee as this application) shows yet another refrigeration compressor wherein the motor is horizontally disposed and wherein lubricant is transmitted to the motor for cooling purposes.

In a commercial approach widely followed by the assignee of this application, an oil tube is disposed above the magnetic core of a horizontally disposed motor, and oil dispersed therefrom showers down on the motor for cooling purposes.

We have determined that with arrangements such as those shown in the Rogers patent and such as the commercial approach just mentioned, some of the oil gets into the air gap between the rotor and stator of the motor. Moreover, whether the oil gets into the air gap inadvertently or as the result of a deliberate design, a viscous drag is applied to the rotor and the efficiency of the system is reduced.

Accordingly, it would be desirable to provide new and improved methods of operation wherein efficiency reductions associated with oil in the air gap of a hermetically sealed electric motor can be reduced, if not eliminated.

It also would be desirable to provide new and improved motor component designs, as well as methods of making the same, which would overcome the oil in air gap problem.

SUMMARY OF THE INVENTION

Accordingly, it is a general object of the present invention to provide new and improved methods for checking the flow of oil into the air gaps of hermetically sealed compressor motors.

A more specific object of the present invention is to provide new and improved electric motor components that may be relied upon, during normal operation thereof, for checking oil flow into compressor motor air gaps.

It is yet another object of the present invention to provide new and improved methods for making such motor components.

In carrying out the above and other objects of the invention, in preferred forms thereof, we provide a method of counteracting the tendency for oil to enter a compressor motor air gap. Preferably, the method is carried out by the provision of means that interrupt the normally smooth surface of a rotor to which oil would otherwise adhere. Either alternatively or additionally, a sweeping action is carried out for moving oil to stator slots adjacent to the motor air gap and thus out of the air gap.

In putting the invention into practice, in one preferred form thereof, the construction of conventional rotors of compressor motors is modified by providing one or more grooves along the surface of such rotor. In one form, grooves may be cut into the surface of the rotors by using a tool such as a file or ball end mill. In other forms, grooves or dents may be coined or otherwise pressed into the rotor; or such grooves may be provided as a result of the configuration of the individual rotor laminations. The rotor grooves may be disposed parallel to the rotor axis or disposed spiralled (clockwise and counterclockwise); and either one or a plurality of grooves may be provided. Thus, circular, triangular, or square or rectangular holes may be provided on individual punchings to be used in the manufacture of a rotor so that when the rotor is assembled a groove on a notch will already be formed therein for the purposes of carrying out the present invention.

The subject matter which is regarded as our invention is particularly pointed out and distinctly claimed in the concluding portion of this specification. The invention itself, however, together with further objects and advantages thereof, may be best understood by reference to the following description taken in conjuction with the accompanying drawings wherein like reference numerals have been utilized to denote like parts.

BRIEF DESCRIPTION OF THE DRAWINGS

FIG. 11 is a side elevation, with parts in section, parts removed, and parts broken away of a fixture that may be utilized in the practice of the present invention and to produce rotors embodying the invention; and FIG. 12 is a view of a portion of an individual rotor lamination.

DESCRIPTION OF THE PREFERRED EMBODIMENTS

Figure 1:
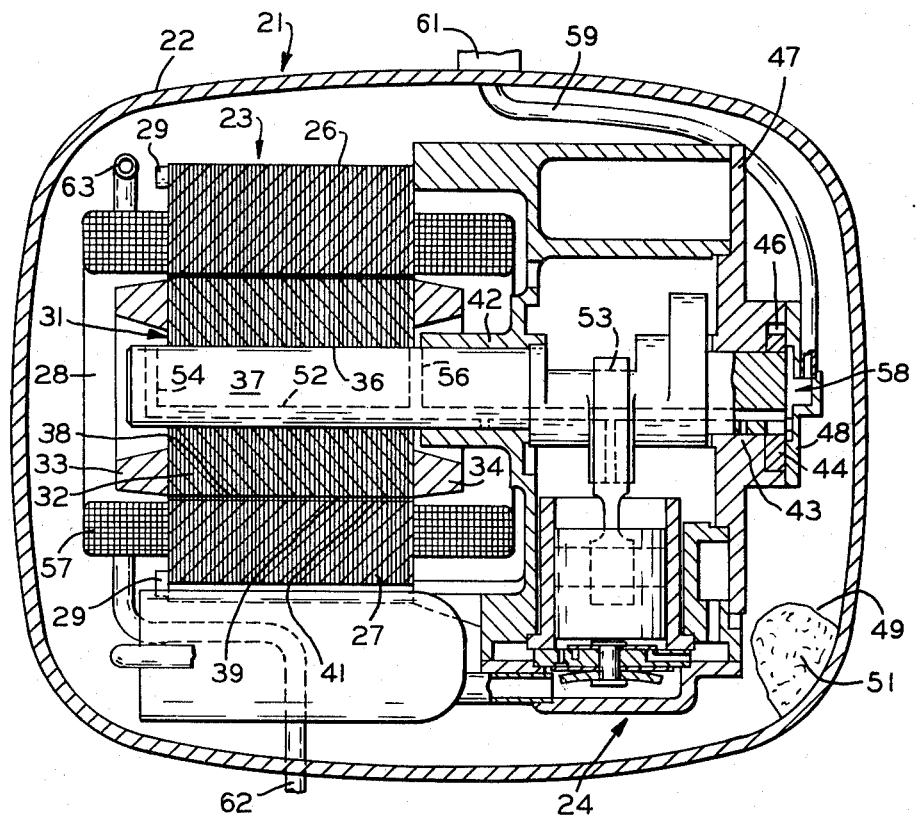
FIG. 1 is a horizontal section view of a hermetic compressor, and represents one of the types of compressors in which the present invention may be embodied.

In FIG. 1, a hermetic compressor, i.e. a motor compressor unit 21 hermetically sealed within a casing 22, has been shown. The unit 21 has been illustrated to be substantially identical with the unit illustrated and fully described in U.S. Pat. No. 3,600,111. In order to simplify the illustration and length of this specification, the entire disclosure of U.S. Pat. No. 3,600,111 is incorporated herein by reference.

It will be understood that the unit 21 includes a motor generally denoted by the reference numeral 23 and a compressor generally denoted by the reference numeral 24. The stator 26 of the motor, which includes a magnetic stator core 27 and excitation windings 28, is fastened to the compressor by means of bolts 29. The rotor 31 of the motor includes a magnetic core 32 and a squirrel cage winding made up of a plurality of generally axially extending conductors which are connected in short circuit relationship at opposite ends thereof by means of end rings 33, 34. A central bore 36 of the rotor accommodates the compressor shaft 37 with which the rotor is assembled. The outer diameter 38 of the rotor is accurately machined and, when the motor 23 is assembled as shown in FIG. 1, an axially extending air gap 39 is established and maintained between the bore 41 of the stator and the outer diameter 38 of the rotor.

The compressor shaft 37 is supported for rotation by bearings 42, 43. The right-hand end of the shaft 37 (as viewed in FIG. 1) carries an eccentric 44 which rotates in an annular pump chamber 46 that is formed in the compressor bearing plate 47. A cap 48 is fastened to the bearing plate 47 and defines a number of passages along which lubricant (e.g., lubricating oil) may be positively displaced by the action of the eccentric 44 within the chamber 46. A suction tube (not visible in FIG. 1) extends downwardly below the compressor and is in communication with lubricant stored in the bottom or lubricant sump portion of the casing 22. For purposes of orientation, the general vicinity of the sump has been denoted by the reference numeral 49 in FIG. 1, and a small portion of lubricant 51 has also been shown.

The specific compressor illustrated in FIG. 1 is designed so that the pump 58 will supply oil under pressure along a radially offset, axially extending passage 52 formed in the compressor shaft. Cross passages are also provided along which oil is supplied to the bearings 42 and 43, and piston crank bearing 53.

It will be noted that passages 54, 56 are also provided along which oil is supplied and such oil is discharged within the end rings 33, 34. Due to the rotation of the rotor 31, the oil supplied along passages 54, 56 is flung outwardly from the end rings and onto the end turns 57 of the motor windings. As will be understood by persons skilled in the art, this lubricant is supplied for the purpose of cooling the windings and thus the motor. After being sprayed onto the motor end turns, the lubricant supplied through passages 54, 56 drips back into the sump of the compressor. Oil is also supplied from the rotary oil pump 58 via an oil line 59 to an oil cooler tube 61 located externally of the compressor casing 22. After circulating through the external oil cooler tube, the oil then is returned through tube 62 (which is connected to the oil cooler tube) to the interior of the sealed casing 22. The cooled return oil is discharged from the end 63 of the tube 62 and flows down into the sump of the compressor.

At this point, it is emphasized that the motor compressor unit illustrated in FIG. 1 has been selected for purposes of illustration only and that different specific arrangements of motor and compressor components will benefit from the use of our invention. For example, tests were made involving the present invention in a motor compressor unit having a horizontally disposed shaft but wherein oil was sprayed directly on the motor rather than through passages formed in the shaft. Thus, an oil tube carried oil under pressure to the top of the stator core and there discharged oil at approximately the center of the core so that the oil would run over and trickle along the core of the stator and thence to the lubricant sump in the compressor casing.

In virtually any hermetic compressor motor application, oil will find its way to the air gap defined by the outer diameter of the rotor and the bore of the stator. Once in the air gap, the oil (or other cooling medium used) will cause a viscous drag and tend to retard movement of the rotor. This drag represents a power loss and thus decreased efficiency of motor operation.

Figure 2:
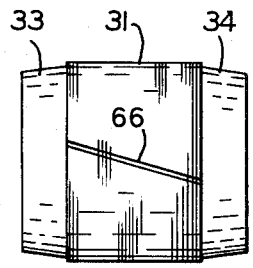
FIGS. 2, 3, and 4 are side elevations of different rotors embodying the invention.
Figure 3:
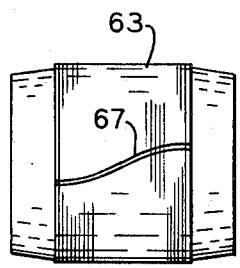
Figure 4:
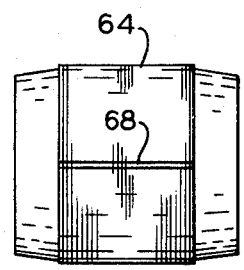

We have now determined that when means for sweeping oil from the air gap are provided in the air gap, the motor efficiency will be improved. The most convenient way of providing means for sweeping oil from the air gap appears to be the provision of some means that interrupt the smooth outer cylindrical surface of the rotor. Such means conveniently are in the specific form of one or more depressions, dents, or grooves that extend generally axially along the outer surface of the rotor. Three examples of such generally axially extending grooves or depressions are illustrated in FIGS. 2-4 wherein three rotors 31, 63, and 64 have been illustrated. The rotors 31, 63, and 64 are virtually identical except for the precise details of the grooves 66, 67, and 68 provided thereon. Tests have revealed that similar results are achieved whether the groove is skewed upwardly to the left as shown at 66 in FIG. 2 or in a sense opposite to that shown in FIG. 2 (i.e. upwardly to the right as viewed in FIG. 2 and as also suggested by FIG. 3). Moreover, herring bone patterns of grooves do not seem to give measurably different results than essentially single grooves as shown in FIGS. 2, 3, and 4; and essentially the same results have been achieved whether the groove was straight or spiralled as in FIG. 3.

The groove 67 was machined into the rotor 63 (see FIG. 3) by using a ball end mill and was spiralled; whereas the machined groove 68 in the rotor 64 was essentially parallel to the axis of the rotor. Again, it is emphasized that similar results were obtained with all three of the rotors having generally axially extending grooves as illustrated in FIGS. 2-4.

It also is now noted that a single groove may be provided in the rotor, two grooves spaced approximately 180° apart may be used, or any other desired number of grooves may be provided. A single groove provides the desirable benefits of improved motor efficiency. Thus, additional grooves, while perhaps aesthetically pleasing and while perhaps providing for a better dynamic balance of the rotor, are not in fact necessary for the satisfactory practice of the present invention.

Persons skilled in the art, once they are aware of our teachings, will readily recognize numerous different ways of providing means for sweeping oil from the air gap in actual practice. As suggested earlier, grooves may be machined into the surface of the rotor with a file, milling machine, etc. However, these approaches produce machining scrap or "chips" and it thus would be generally more desirable to follow an approach as suggested in FIGS. 5–11 and which will be described in more detail hereinbelow.

Before commencing with the description of FIGS. 5–11, attention is directed to FIG. 12 wherein a portion of a single rotor lamination has been illustrated. It will be appreciated by persons of ordinary skill in the art that the rotor lamination 71 shown in FIG. 12 is quite similar to the laminations shown in Rediger et al U.S. Pat. No. 3,330,031 (which is assigned to the same assignee as this application). The rotor lamination 71 does differ from the Rediger et al laminations in the respect that a peripheral notch or groove 72 is provided therein. Preferably, notch 72 would be provided at the time that the lamination is initially produced. The notch 72 would be located and sized so that when lamination 71 and a number of others identical to it were used to fabricate a rotor, the individual notches 72 would be aligned with one another so as to provide a generally axially extending groove (whether or not the laminations were skewed as taught by the Rediger et al Patent). After final machining of rotors made up with the lamination 71, the groove 72 would thus provide an interruption in the smooth surface of the rotor and would constitute means for sweeping oil from the air gap of the motor.

As a point of information, it is noted that it is a common practice (especially in the hermetic motor art) for adjacent laminations to be angularly displaced slightly from laminations adjacent thereto so that the conductor bars are skewed as clearly taught and illustrated in the above referenced Rediger et al Patent (the entire disclosure of which is incorporated herein by reference).

It is presently believed that the preferred mode of putting our invention into practice would involve the provision of a groove in the surface of the rotor without the production of any machining "chips". The easiest way to accomplish this objective, it is believed, is to swage or coin a groove or notch in the surface of the rotor. With reference for a moment once again to FIG. 12, it will be appreciated that a small bridge of metal 74 overlies each slot 76 in which a conductor is cast. Although the bridge 74 is made from lamination iron, the conductor material in the slots 76 is cast aluminum and relatively soft. Moreover, the bridges 74 are relatively thin. Accordingly, it is relatively easy to indent or coin the surface of the rotor in the vicinity of the bridges 74 which overlie the conductors in the slots 76.

Figure 5:
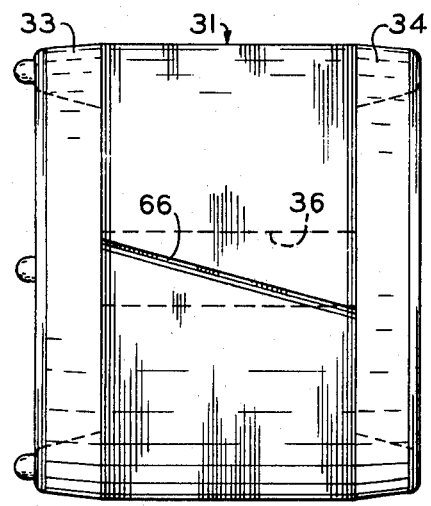
FIG. 5 is a side elevation the rotor of FIG. 2, drawn to an enlarged scale.
Figure 6:
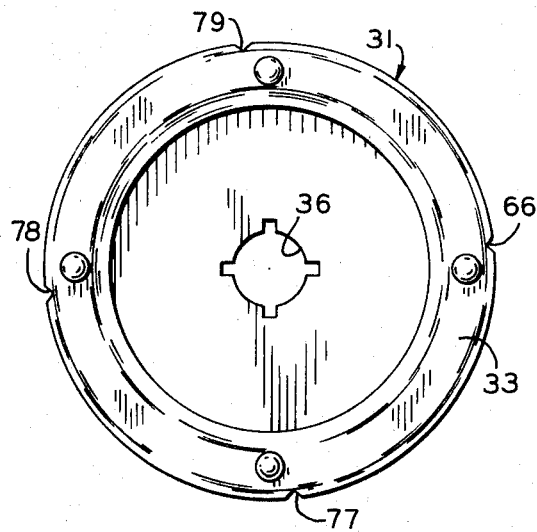
FIG. 6 is an end view of the rotor shown in FIG. 5.
Figure 7:
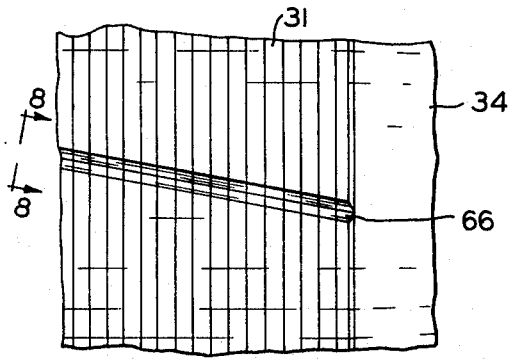
FIG. 7 is a view to an enlarged scale of a portion of the structure shown in FIG. 5.
Figure 8:
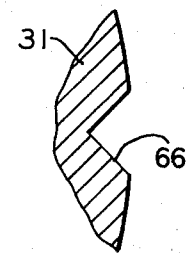
FIG. 8 is a cross section view taken in the direction of lines 8—8 in FIG. 7.

With reference now to FIGS. 5–7, such a coining or swaging procedure will be described in connection with establishing the grooves 66 and 77–79 in the surface of the rotor 31. It will be noted from FIG. 5 that the groove 66 is skewed relative to the longitudinally extending axis or central bore of the rotor body itself. This skew is because of the skew of adjacent laminations and thus the skew of the individual rotor conductors as mentioned hereinabove in connection with the Rediger et al Patent.

For purposes of symmetry and balance, four grooves 66 and 77–79 were provided on the rotor 31. However, as mentioned earlier, the single groove 66 would provide an adequate oil sweeping action in the air gap. As also indicated hereinabove, the size, shape, and depth of the groove 66 is not critical, it being necessary only that the smooth outer surface of the rotor be interrupted. We have determined that a groove having a depth of no more than about one sixty-fourth of an inch will provide an adequate sweeping action. In large volume production, it would be satisfactory to use a tool such as the tool 81 of FIG. 9 in order to coin grooves in the rotors, with the tool 81 having a dimension "d" of from about 0.015 to about 0.025 of an inch. The tool 81 has a leading or working edge that is wedge shaped, and that forms a groove 66 having an included angle of 90° (see FIG. 8). However, the contour of the working face of tool 81 does not appear to be critical; and it again is emphasized that it is primarily important only that the smooth surface of the rotor be interrupted.

Figure 10:
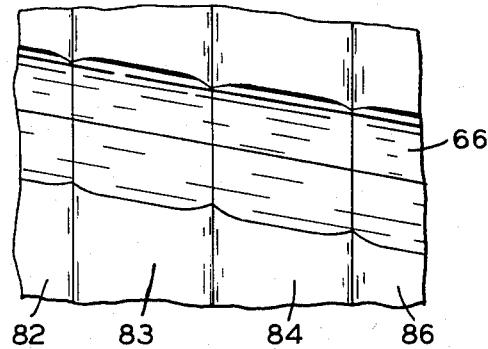
FIG. 10 is a view, to still an even larger scale, of a portion of the structure of FIG. 7.
Figure 9:
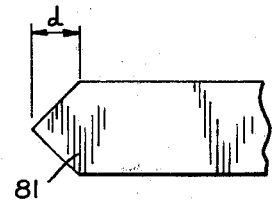
FIG. 9 is a side elevation, with parts broken away, of a tool of the type that could be used for producing the rotor of FIG. 8.

FIG. 10 is an enlarged view of the surface of the rotor 31 in which individual laminations 82–84 and 86 can be seen, as well as the relationship between such laminations and the coined groove 62. FIG. 7 reveals these same general relationships, but to a somewhat smaller scale.

With reference now to FIG. 11, apparatus devised for the purpose of forming the grooves 66 into the rotor 31 will be described. The actual apparatus 88 shown in FIG. 11 was devised by a person other than us, such person being an employee of the assignee of this application. It is believed that a separate application, assigned to the assignee of this application, will be filed in the name of Richard D. Burns and that such application will fully disclose and claim the apparatus 88. However, in the interest of completeness of disclosure, and in the interest of setting forth the best mode presently contemplated for carrying out and putting into practice our invention, the apparatus 88 and the essential workings thereof will now be described herein.

Apparatus 88 includes a main frame or base 89 to which is attached an air cylinder 91 by means of bolts 92, 93. The rod 94 of the cylinder 91 slides along a bushing 96 disposed in a hole 97 in the frame 89. The rod 94 includes a centering pin 98 which is used to facilitate centering of a rotor thereon and a shoulder 99 on the rod 94 will support a rotor in a desired position within the apparatus 88. At the conclusion of an operational sequence of the apparatus 88, the cylinder 91 is actuated so that the rod thereof extends to its dotted line position shown in FIG. 11, and the rotor 105 supported thereon may then be removed.

A rotor holding fixture in the form of casting 101 is fastened to the frame 89 by means of a number of dowels 102 and a bolt 103. The casting 101 has a generally cylindrical bore machined therein to provide lateral support for a rotor (such as the rotor 105) during operation of the apparatus. As will be readily understood from a review of FIG. 11, the casting 101 is milled out to provide a trackway along which a tool 106 may slide. The tool 106 is supported on a pair of heavy machine bolts 107, 108, and urged to the retracted position shown in FIG. 11 by means of a pair of die springs 110, 111. The working edge 112 of the tool 106 is contoured and shaped the same as the working edge of tool 81 (shown in FIG. 9 and discussed hereinabove).

Attached to the frame 89, e.g., by welding, is a plate 115 to which a hydraulic cylinder 116 is attached. The rod of the cylinder 116 is fastened to a slider generally denoted by the reference numeral 117 which carries a ram 118 and a ram support 119. The ram 118 is adjustable with respect to the support 119 by means of the screw 121, adjustment of the screw 121 causing the ram 118 to slide upwardly or downwardly along the inclined face 122 of the support 119. Thus, the actual distance that the tool 106 will be driven to the left by ram 118 (as viewed in FIG. 11) may be varied by adjusting the screw 121 even though the stroke of cylinder 116 is held constant.

During operation of the apparatus 88, a rotor such as the rotor 105 is positioned within the bore of the casting 101. Thereafter, the cylinder 116 is momentarily actuated and the tool 106 is driven to the left by ram 118, at which time a groove is coined or swaged into the generally cylindrical surface of the magnetic rotor core. If desired, the rotor may be repositioned and additional grooves may be placed in the same rotor 105. In any event, when work on the rotor 105 has been completed, the cylinder 91 is actuated, the rotor 105 is elevated to the phantom line position thereof shown in FIG. 11, and the rotor is removed from the apparatus.

It now will be understood that we have disclosed new and improved methods, and structures that result in improved electric motor efficiency, particularly in hermetically sealed compressor applications. Thus, in view of all of the foregoing, it should be apparent that methods and apparatus which meet the objects and provide the advantageous features set out hereinabove have been disclosed herein. In addition, it should be apparent that modifications in the methods and structures particularly described herein may be made by those having ordinary skill in the art without departing from the spirit of the invention.

What we claim as new and desire to secure by Letters Patent of the United States is:

1. In a motor-compressor unit having a casing surrounding an electric motor and a compressor, the unit including lubricant for use in lubricating compressor and motor bearings and for use in cooling at least parts of the electric motor, said electric motor comprising a stator including a core having winding accommodating means, a rotor receiving bore, and windings carried by said means outwardly of said bore with end turns extending axially beyond each end face of said core; and said motor further comprising a rotor mounted for relative rotation with said stator, said rotor comprising a laminated body having a generally cylindrical surface disposed within the bore of said stator and establishing an air gap therewith, said rotor including generally axially extending means for sweeping lubricant from the air gap thereby to reduce viscous drag between the rotor and stator and increase the efficiency of the unit.

2. The invention of claim 1 wherein the means for sweeping comprises at least one at least generally axially extending interruption in said generally cylindrical surface.

3. The invention of claim 1 wherein the means for sweeping comprises at least one depression extending generally axially along said generally cylindrical surface.

4. The invention of claim 3 wherein the at least one depression is coined into said surface.

5. The invention of claim 3 wherein the rotor is made up of a number of laminations, and the at least one depression is established by aligned surface depressions formed in individual laminations.

6. The invention of claim 3 wherein the rotor is made up of a number of laminations having conductor accommodating means therein, wherein the laminations are skewed relative to one another and skewed squirrel cage conductors extend between ends of the rotor, and wherein the at least one depression is skewed along the cylindrical surface.

7. The invention of claim 6 wherein the at least one depression is along a conductor.

8. The invention of claim 6 wherein at least two depressions are provided in the rotor surface.

9. In a motor-compressor unit having a casing surrounding motor and compressor parts, and fluid used for lubricating parts of the unit, an electric motor comprising a stator including a core having winding accommodating means, a rotor receiving bore, windings carried by said means with end turns extending axially beyond each end face of said core, and a laminated rotor mounted for relative rotation in the bore of said stator and defining an air gap therewith, said rotor including a laminated magnetic core and a squirrel cage winding provided by conductors extending at least generally axially along the rotor core and by end rings interconnecting said conductors at each end of the rotor core, said rotor having a generally cylindrical surface and also having means therealong for sweeping lubricant from the air gap; said means for sweeping comprising a generally axially extending elongate depression in said surface.

10. A laminated rotor for use in a motor-compressor unit comprising a compressor and a motor including a stator and rotor assembled together and defining a motor air gap therebetween, wherein a coolant is applied to at least part of the motor during operation of the unit, and wherein said rotor comprises a laminated magnetic core having a generally smooth cylindrical surface with conductive means accommodated thereby; the improvement comprising means extending generally axially along said generally cylindrical surface for sweeping coolant from the motor air gap, thereby to contribute to increased motor efficiency by decreasing power losses associated with viscous drag caused by coolant in the air gap.

11. The rotor of claim 10 wherein the means for sweeping comprises a groove extending generally axially along the rotor surface.

12. The rotor of claim 11 wherein the groove is machined into said rotor surface.

13. The rotor of claim 12 wherein said groove is coined into said surface.

14. A method of manufacturing a laminated rotor for use in a motor-compressor unit comprising a stator and rotor assembled together and defining a motor air gap therebetween, and wherein a coolant is applied to at least part of the motor during operation of the unit, the method comprising: producing a rotor comprising a laminated magnetic core having a generally smooth cylindrical surface with conductive means accommodated thereby and providing means extending generally axially along such surface for sweeping coolant from the motor air gap thereby to contribute to increased motor efficiency by decreasing power losses associated with viscous drag caused by coolant in the air gap.

15. The method of claim 14 wherein the step of providing means along such surface for sweeping coolant comprises interrupting the smoothness of the generally cylindrical surface of the rotor.

16. The method of claim 15 wherein the step of interrupting comprises machining at least one axially extending groove in the outer surface of the rotor.

17. The method of claim 16 wherein the step of machining comprises coining at least one groove along the outer surface of the rotor.

18. The method of claim 17 wherein the step of coining comprises locating the at least one groove over a generally axially extending rotor conductor.

19. The method of claim 14 wherein the step of providing means along such surface for sweeping coolant comprises utilizing individual rotor laminations having notches formed along the outer peripheral surfaces thereof.

* * * * *